US008340889B2

(12) United States Patent
Ferman et al.

(10) Patent No.: US 8,340,889 B2
(45) Date of Patent: Dec. 25, 2012

(54) SYSTEM AND METHOD FOR AGGREGATING PROBE VEHICLE DATA

(75) Inventors: Martin A. Ferman, Huntington Woods, MI (US); Xiaowen Dai, Shelby Township, MI (US); Robert P. Roesser, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 968 days.

(21) Appl. No.: 11/393,320

(22) Filed: Mar. 30, 2006

(65) Prior Publication Data

US 2007/0233359 A1 Oct. 4, 2007

(51) Int. Cl.
*G06F 19/00* (2011.01)

(52) U.S. Cl. ........ 701/117; 701/414; 701/423; 701/437; 701/454; 340/907; 340/995.1; 340/995.15; 340/995.19

(58) Field of Classification Search .................. 701/117, 701/423, 414, 437, 454, 461, 460, 532; 340/907, 340/995.1, 995.15, 995.19
See application file for complete search history.

(56) References Cited

U.S. PATENT DOCUMENTS

| | | | | |
|---|---|---|---|---|
| 5,410,485 | A * | 4/1995 | Ichikawa | 701/428 |
| 5,884,218 | A * | 3/1999 | Nimura et al. | 701/428 |
| 7,050,903 | B1 * | 5/2006 | Shutter et al. | 701/117 |
| 2005/0137793 | A1 * | 6/2005 | Krull et al. | 701/210 |
| 2007/0150185 | A1 * | 6/2007 | Nagase et al. | 701/209 |

* cited by examiner

*Primary Examiner* — Redhwan k Mawari

(57) ABSTRACT

A system and method for combining sequential map segments to aggregate, analyze, and display traffic data collected from one or more probe vehicles located on one or more of the map segments.

2 Claims, 1 Drawing Sheet

SYSTEM AND METHOD FOR AGGREGATING PROBE VEHICLE DATA

TECHNICAL FIELD

The present invention relates to systems and methods for collecting traffic data using probe vehicles. More specifically, the present invention concerns a system and method for combining sequential map segments to aggregate, analyze, and display traffic data collected from one or more probe vehicles located on one or more of the map segments.

BACKGROUND OF THE INVENTION

It is known to use vehicles as probes for measuring traffic conditions in real-time. Each such probe vehicle is equipped with position-determining and communication equipment in order to provide such data as, for example, the vehicle's time, speed, position, and heading, which can then be used to estimate such factors of interest as travel time and traffic speed.

A map segment corresponds to a portion of a road, or one side of the road if the road is divided, lying generally between intersections with other roads or features, such as, for example, geopolitical or other boundaries. Map segments are defined by a map database. The travel time along each map segment is estimated based upon the reported speeds of all probe vehicles traveling on that map segment. Unfortunately, because probe vehicles are distributed substantially randomly, individual map segments may at times be devoid of probe vehicles, such that the needed speed information is not available. This is especially true when there is low probe vehicle penetration and at off-peak times.

For this and other reasons, a need exists for an improved method of collecting traffic data.

SUMMARY OF THE INVENTION

The present invention provides a system and method for combining sequential map segments to aggregate, analyze, and display traffic data collected from one or more probe vehicles located on one or more of the map segments. The combined map segments may be referred to as a "superlink".

In a first embodiment, second and third streets are identified which intersect a first street. The plurality of sequential map segments associated with the first street and located between the intersections are combined to define the superlink.

In a second embodiment, the plurality of sequential map segments are identified extending between an intersection of the first street and the second street and an intersection of the first street and the third street, and the identified plurality of sequential map segments are combined to define the superlink.

In a third embodiment, a set of map segments is identified, wherein each map segment of the set of map segments is associated with a through street having a name. Then, the set of map segments is sorted according to the names of their respective through streets, and, for each through street name, a subset of map segments is identified as being associated with the through street name. Next, for each map segment of each subset of map segments, a longitude range is determined, including a beginning longitude and an ending longitude, and a latitude range is determined, including a beginning latitude and an ending latitude. Then, one or more nodes at which each subset of map segments intersects any other subsets of map segments are identified, resulting in a plurality of such nodes. Next, the plurality of nodes is sorted by the larger of the longitude range or the latitude range of each map segment associated with one or more nodes of the plurality of nodes. Then, for each pair of adjacent nodes of the plurality of nodes, the plurality of map segments extending between the pair of adjacent nodes are determined, and the plurality of map segments are combined to define the superlink.

Once the superlink has been generated, the data received from one or more probe vehicles traveling on one or more of the plurality of map segments associated with the superlink is aggregated. Traffic data based on the aggregated data is generated and then transmitted to one or more subscriber vehicles.

These and other features of the present invention are discussed in greater detail in the section below titled DESCRIPTION OF THE PREFFERED EMBODIMENT.

BRIEF DESCRIPTION OF THE DRAWINGS

A preferred embodiment of the present invention is described in detail below with reference to the attached drawing figures, wherein.

DESCRIPTION OF THE PREFERRED EMBODIMENT

With reference to the figures, a system 10 and method are herein described and otherwise disclosed in accordance with a preferred embodiment of the present invention. Broadly, the present invention involves combining sequential map segments to aggregate, analyze, and display traffic data collected from one or more probe vehicles located on one or more of the map segments. The resulting combination may be referred to herein as a "superlink".

Figure 1:
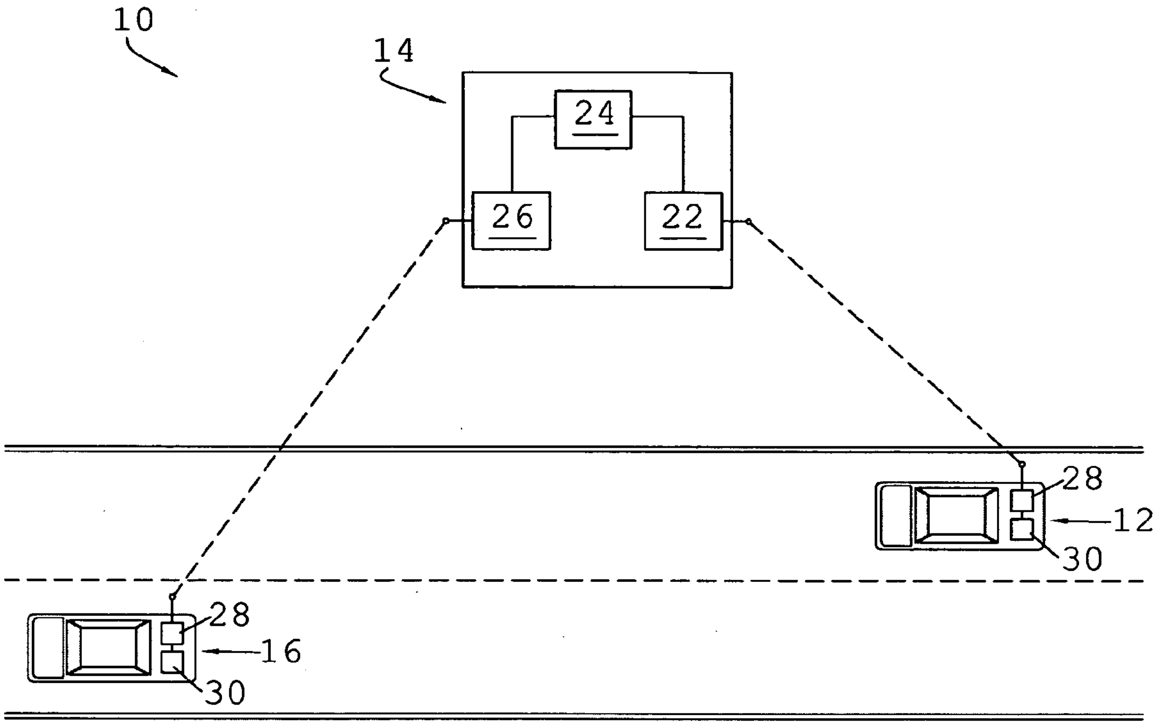
FIG. 1 is a depiction of a preferred embodiment of the system of the present invention.

Referring to FIG. 1, an embodiment of the system 10 is shown broadly comprising one or more probe vehicles 12; a processing center 14; and one or more subscriber vehicles 16. Each probe vehicle 12 broadly comprises a global positioning system (GPS) unit 18 or other position-determining equipment for determining a position of the probe vehicle 12, and a wireless transmitter 20 or other communication equipment for transmitting the position data to the processing center 14. The probe vehicle 12 may also include one or more of any of a variety of different sensors or other data collection equipment for collecting any of a variety of different data which is then also transmitted using the wireless transmitter 20. The processing center 14 implements or otherwise makes use of the method of the present invention to collect and analyze the data provided by the probe vehicle 12, and broadly comprises a wireless receiver 22 or other communication equipment for receiving position and other data transmitted by the probe vehicle 12, a computing device 24 for analyzing the received data and generating traffic data, and a wireless transmitter 26 for transmitting the traffic data to the subscriber vehicle 16. Each subscriber vehicle 16 broadly comprises a wireless receiver 28 for receiving the traffic data transmitted by the processing center 14 and a display device 30 for displaying the received traffic data.

Figure 2:
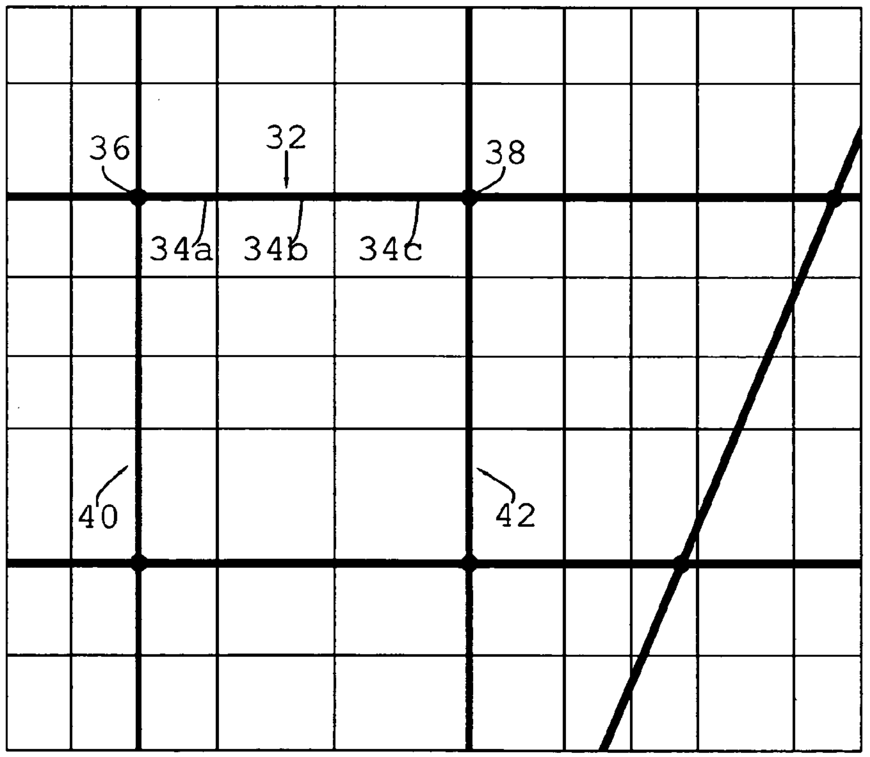
FIG. 2 is a depiction of map segments and combined map segments.

Referring also to FIG. 2, in one embodiment of the present invention, a superlink 32 comprises a plurality of sequential map segments 34*a*,34*b*,34*c* along a street of a given name lying between intersections 36,38 with other superlinks 40,42. More specifically, a first superlink 32 begins where the street intersects 36 a second superlink 40 and ends where the street intersects 38 a third superlink 42. Preferably, superlinks 32 are formed only from "through" streets, such as, for example, arterials and freeways. Because the superlink 32 is substantially longer than a single map segment 34*a*,34*b*,34*c* a greater number of probe vehicles 12 can be expected to be traveling on the superlink 32 at any given time.

The method of generating superlinks from a map database may be implemented as follows. This method may be substantially automatically performed, in whole or in part, by a computing device, such as the computing device 24 of the processing center 14, executing a series of instructions that substantially correspond to the steps of the method. In a first embodiment, second and third streets are identified which intersect a first street. The plurality of sequential map segments associated with the first street and located between the intersections are combined to define a superlink.

In a second embodiment, the plurality of sequential map segments are identified extending between an intersection of the first street and the second street and an intersection of the first street and a third street, and the identified plurality of sequential map segments are combined to define the superlink.

In a third embodiment of the method, a set of map segments is identified, wherein each map segment of the set of map segments is associated with a through street having a name. Then, the set of map segments is sorted according to the names of their respective through streets, and, for each through street name, a subset of map segments is identified as being associated with the through street name. Next, for each map segment of each subset of map segments, a longitude range is determined, including a beginning longitude and an ending longitude, and a latitude range is determined, including a beginning latitude and an ending latitude. Then, one or more nodes at which each subset of map segments intersects any other subsets of map segments are identified, resulting in a plurality of such nodes. Next, the plurality of nodes is sorted by the larger of the longitude range or the latitude range of each map segment associated with one or more nodes of the plurality of nodes. Then, for each pair of adjacent nodes of the plurality of nodes, the plurality of map segments extending between the pair of adjacent nodes are determined, and the plurality of map segments are combined to define the superlink.

As mentioned, in each of the foregoing embodiments the first street is preferably a through street. Furthermore, the second and third streets are preferably through streets as well.

Once a superlink has been generated, the data received from one or more probe vehicles traveling on one or more of the plurality of map segments associated with the superlink is aggregated. Traffic data based on the aggregated data is generated, and the traffic data is then transmitted to one or more subscriber vehicles.

From the preceding description it will be understood and appreciated that the present invention provides a number of advantages over the prior art, including, for example, relaxing the penetration requirement for probe vehicles, improving the estimation of travel time and increasing the coverage for a given pool of probe vehicles, making traffic data more manageable, facilitating the analysis of traffic data, and simplifying the display of traffic data for drivers.

Although the present invention has been described with reference to the preferred embodiments illustrated in the drawings, it is noted that equivalents may be employed and substitutions made herein without departing from the scope of the invention as recited in the claims. Thus, for example, it will be understood and appreciated by those with ordinary skill in the relevant art that alternative methods may exist for generating the superlinks of the present invention.

The invention claimed is:

1. A method of generating traffic data associated with a targeted street, the method comprising the steps of:

(a) combining a plurality of sequential map segments associated with a first through street using a computing device, by identifying a set of map segments, wherein each map segment of the set of map segments is associated with a through street, and wherein each through street has a name; sorting the set of map segments according to the names of their respective through streets, and identifying, for each through street name, a subset of map segments associated with the through street name; determining, for each map segment of each subset of map segments, a longitude range including a beginning longitude and an ending longitude, identifying one or more nodes at which each subset of map segments intersects all other subsets of map segments, resulting in a plurality of nodes; sorting the plurality of nodes, so as to determine at least one pair of adjacent nodes; and determining for each pair of adjacent nodes of the plurality of nodes, the plurality of map segments extending between the pair of adjacent nodes, and combining the plurality of map segments;

(b) aggregating data received from one or more probe vehicles traveling upon one or more of the plurality of sequential map segments, using a computing device;

(c) generating the traffic data for the first street based on the aggregated data, using a computing device; and (d) selectively transmitting the traffic data to one or more subscriber vehicles.

2. The method as set forth in claim 1, wherein step (a) of combining the plurality of sequential map segments further includes determining for each map segment of each subset of map segments a latitude range, including a beginning latitude and an ending latitude; and sorting the plurality of nodes by the larger of the longitude range or the latitude range of each map segment associated with one or more nodes of the plurality of nodes.

* * * * *